Feb. 16, 1937.  A. OFFUTT  2,070,617

BOILER FEED WATER REGULATOR

Filed Nov. 5, 1935

Inventor
Anderson Offutt,
By Robert A. Lavender
Attorney

Patented Feb. 16, 1937

2,070,617

UNITED STATES PATENT OFFICE 2,070,617

BOILER FEED WATER REGULATOR

Anderson Offutt, United States Navy

Application November 5, 1935, Serial No. 48,341

12 Claims. (Cl. 137—101)

(Granted under the act of March 3, 1883, as amended April 30, 1928; 370 O. G. 757)

This invention relates to boiler feed water regulators and it has particular relation to mechanism for controlling the supply of water to ship's boilers.

One of the objects of the present invention is the provision of simple and improved means for controlling the flow of water through the feed pipe in accordance with the level of the water in the gage glass.

Another object of the invention is the provision of a regulator of the character described embodying means for not only interrupting the supply of water to the boiler when it reaches a first predetermined or operating level but which, in the event that the pitching of the vessel in rough weather permits the supply to be resumed and reach a higher and dangerous level, will function to cut off the supply at such higher level and maintain the supply interrupted until the level recedes to the operating level.

Still another object of the invention is the provision of a regulator embodying light-sensitive means including a source of light which may quickly and easily be mounted on opposite sides of a water gage glass containing an opaque medium, such as a float or the like, for interrupting the light beam at a predetermined level and which may be contained within a suitable housing for convenient attachment and removal.

A further object of the invention is the provision of a regulator embodying means for interrupting the flow of water to a boiler when it reaches a predetermined maximum level and maintaining the same cut off until the water recedes to a predetermined minimum or preferred operating level.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical effect, without limiting the improvements in their useful application to the particular construction, which, for purposes of explanation, have been made the subject of illustration.

Figure 1:
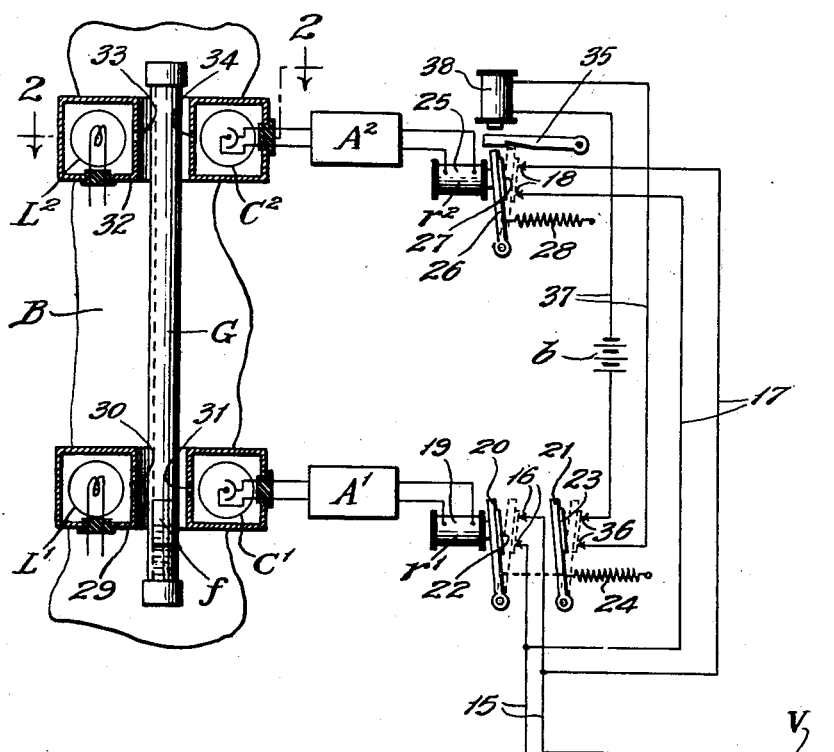
Figure 2:
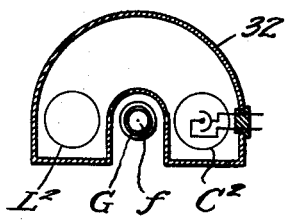
Figure 2:
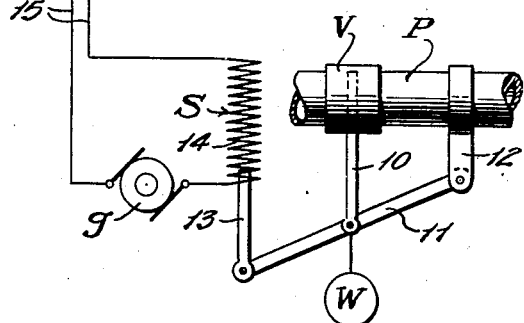

In the accompanying drawing:

Fig. 1 is a diagrammatic view of a boiler water feed regulator constructed in accordance with the invention; and Fig. 2 is a horizontal sectional view taken on line 2—2 of Fig. 1.

Referring to the drawing, the invention is shown as comprising a boiler B equipped with the usual water gage glass G provided with an opaque float $f$ and supplied with water through a feed pipe P having a valve V therein. The valve V is provided with a downwardly extending stem or rod 10 which is pivotally connected to a lever 11 intermediate its ends and is normally maintained in the open position shown by means of a weight W. The lever 11 is pivotally mounted at one end upon a bracket 12 carried by the pipe P, and its other end is pivotally connected with the lower end of an armature 13 which extends upwardly through the coil 14 of a solenoid S.

This solenoid is at times energized, to close the valve V, by means of electric current from a suitable source, such as a generator $g$, which is connected to either of two parallel circuits, the first of said circuits comprising wires 15 connected with the terminals of the coil 14 and terminating in contacts 16 of a first relay $r^1$, and the second of said circuits comprising wires 17 terminating in contacts 18 of a relay $r^2$.

The relay $r^1$ includes a normally energized electro-magnet 19 and includes two pivotally mounted armatures 20 and 21, which are provided with contact pieces 22 and 23 respectively, and which are mechanically connected to move in unison in any preferred manner. The armatures 20 and 21 are normally held in the position shown in full lines by the attraction of the electro-magnet 19, although resiliently urged toward the contacts 16 by a coil spring 24 toward the position indicated by dotted lines so as to close the contacts 16 and 36.

The relay $r^2$ also includes a normally energized electro-magnet 25 and a single pivotally mounted armature 26 provided with a contact element 27 for engagement with the fixed contacts 18. This armature is normally held in the position shown, by the attraction of the electromagnet 25 but is yieldably biased toward the position indicated by dotted lines so as to close the contacts 18—18, by means of a coil spring 28.

The relay $r^1$ is energized by electric current generated by a photo-electric cell $C^1$ upon which a beam of light is projected through the gage glass G from a lamp $L^1$, both located at an operating level. This current may be increased in value by a suitable amplifier A¹ inserted in the circuit. The photo-electric cell C¹ and the lamp L¹ are preferably contained in a housing 29 of U-shape which embraces the gage glass G and is removably held in position in any suitable manner. The housing 29 is provided with two aligned openings 30 and 31 so that light emanating from the lamp L¹ will be collected into a pencil-like beam and projected directly upon the light sensitive elements of the cell C¹. The interior of the portion of the housing 29 containing the lamp L¹ is provided with a bright light reflecting surface so as to intensify the brilliance of the beam projected by the lamp L¹.

The relay r² is energized by electric current generated by a photo-electric cell C² upon which a beam of light is projected through the gage glass G from a second lamp L², both of which are located at a level higher than that of the lamp L¹ and photo-electric cell C¹ and at what may be termed the maximum operating level. The current generated by the photo-electric cell C² may also be increased in value by a suitable amplifying device A² inserted in its circuit. The photo-electric cell C² and its associated lamp L² are also preferably contained in a housing 32 of U-shape which embraces the gage glass G and is removably held in position in any preferred manner. The housing 32 is provided with two aligned openings 33 and 34 so as to direct a concentrated light beam upon the light sensitive element of the photo-electric cell C² and the interior of the housing containing the lamp L², also provided with a bright light reflecting surface.

When the relay r² is deenergized, in a manner presently to be described, and the armature 26 is retracted by its spring 28 so as to close the contacts 18—18, a parallel circuit for the solenoid S will be established so as to close the valve V.

From the above it will be seen that when the level of the water in the boiler and gage glass rises to such an extent that the float f intercepts the beam of light projected by the lamp L¹, the photo-electric cell C¹ is rendered inactive, thereby deenergizing the relay r¹ and permitting the spring 24 to close the contacts 16—16. This will establish a circuit from the generator g through the wires 15 and coil 14 so as to energize the solenoid S, thus causing the armature 13 to be retracted within the same and closing the valve so as to interrupt the supply of water to the boiler. As soon, however, as the level of the water in the gage glass G falls to a point where it no longer obstructs the beam of light, the photo-electric cell C¹ immediately becomes active and reenergizes the relay r¹, thus opening the contacts 16—16 against the action of the spring 24, and deenergizing the solenoid S, and permitting the valve V to open under the action of the weight W.

Let it now be assumed that in rough weather the pitching or rolling of the vessel causes the water in the boiler to surge to such an extent that the level of the water in the gage glass G and the float f will fluctuate between levels above that of the light beam projected by the lamp L¹, notwithstanding the fact that the boiler contains a quantity of water which would be indicated at the normal operating level if it were quiescent. This fluctuation of the float f above and without the beam of light from the lamp L₁ would cause the relay r¹ to open the contacts 16—16, in the manner previously described, thus causing the valve V to open and admit an excess quantity of water into the boiler. If this condition continues the float f will soon fluctuate to a level where it will intercept the beam of light projected by the lamp L². This will immediately render the photo-electric cell C² inactive and permit the spring 28 to retract the armature 26 and close the contacts 18—18, thus completing the parallel circuit so as to again energize the solenoid S and close the valve V.

As soon as the armature 26 is thus retracted it is engaged by a pivoted latch member 35 so as to hold the contacts 18—18 closed, the solenoid S energized, and the valve V closed until the level of the water in the boiler 13 and gage glass G recedes to a point where the float f again intercepts the light beam projected by the lamp L¹. This will again cause the deenergization of the relay r¹ and permit the spring 24 to swing the armatures 20 and 21 to positions in which they respectively close the contacts 16—16 and also a pair of contacts 36—36. The closing of these latter contacts establishes a circuit from a battery b and through wires 37 and winding of an electro-magnet 38. The electro-magnet 38 will immediately retract the latch member 35 from locking engagement with the armature 26, so as to permit the relay r², which is now energized, to attract the armature 26 back to its normal position and open the contacts 18—18 in the auxiliary circuit. However, inasmuch as the contacts 16—16 are still closed, the valve V is maintained closed notwithstanding the opening of the auxiliary circuit, and will remain so closed until the float f falls below the beam of light projected by the lamp L¹. When this occurs the parts will assume the positions first described, so as to permit the hereinabove cycle of operations to be repeated.

It will be understood that means other than the opaque float f may be employed to intercept the light beam projected by the several lamps L. For example, an opaque fluid of low specific gravity may be contained in the gage glass G, or a float operated shutter may be employed for the intended purpose with the same result.

Other modifications and changes in proportion and arrangement of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

What is claimed is:

1. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass for directing a beam of said light through said gage glass onto said light sensitive means; a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of gage glass for directing a beam of said light through said gage glass onto said second mentioned light sensitive means; opaque means responsive to the level of the water in said gage glass for successively interrupting said light beams to successively close said relays and the circuits controlled thereby and thus to energize said electro-magnetic means and close said valve as the level of the water in said boiler ascends to said first predetermined level and thence to said second predetermined level; latch mechanism for maintaining said second mentioned relay and the circuit controlled thereby closed until said opaque means and the water in said boiler descends to said first predetermined level; a second electro-magnetic means for controlling said latch mechanism, and an auxiliary electric circuit controlled by said first mentioned relay for energizing said second electro-magnetic means to release said latch mechanism when said opaque means and the water in the boiler recedes to said first predetermined level.

2. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass for directing a beam of said light through said gage glass onto said light sensitive means; a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of said gage glass for directing a beam of said light through said gage glass onto said second mentioned light sensitive means; opaque means responsive to the level of the water in said gage glass for successively interrupting said light beams to successively close said relays and the circuits controlled thereby and thus to energize said electro-magnetic means and close said valve as the level of the water in said boiler ascends to said first predetermined level and thence to said second predetermined level; latch mechanism for maintaining said second mentioned relay and the circuit controlled thereby closed until said opaque means and the water in said boiler descends to said first predetermined level; and a second electro-magnetic means controlled by said first mentioned relay for releasing said latch mechanism when said opaque means and the water in said boiler reaches said first predetermined level.

3. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass for directing a beam of said light through said gage glass onto said light sensitive means, a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of said gage glass for directing a beam of said light through said gage glass onto said second mentioned light sensitive means; opaque means responsive to the level of the water in said gage glass for successively interrupting said light beams to successively close said relays and the circuits controlled thereby and thus to energize said electro-magnetic means and close said valve as the level of the water in said boiler ascends to said first predetermined level and thence to said second predetermined level; latch mechanism for maintaining said second mentioned relay and the circuit controlled thereby closed until said opaque means and the water in said boiler descends to said first predetermined level; and a second electro-magnetic means for releasing said latch mechanism when said opaque means and the water in said boiler reaches said first predetermined level.

4. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass for directing a beam of said light through said gage glass onto said light sensitive means; a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of said gage glass for directing a beam of said light through said gage glass onto said second mentioned light sensitive means; opaque means responsive to the level of the water in said gage glass for successively interrupting said light beams to successively close said relays and the circuits controlled thereby and thus to energize said electro-magnetic means and close said valve as the level of the water in said boiler ascends to said first predetermined level and thence to said second predetermined level; latch mechanism for maintaining said second mentioned relay and the circuit controlled thereby closed until said opaque means and the water in said boiler descends to said first predetermined level.

5. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass for directing a beam of said light through said gage glass onto said light sensitive means; a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of said gage glass for directing a beam of said light through said gage glass onto said second mentioned light sensitive means; opaque means responsive to the level of the water in said gage glass for successively interrupting said light beams to successively close said relays and the circuits controlled thereby and thus to energize said electro-magnetic means and close said valve as the level of the water in said boiler ascends to said first predetermined level and thence to said second predetermined level; and means for maintaining said second mentioned relay and the circuit controlled thereby closed until said opaque means and the water in said boiler descends to said first predetermined level.

6. A boiler feed water regulator comprising a feed pipe for supplying water to a boiler; a gage glass for indicating the level of the water in said boiler; a valve for controlling the flow of water through said feed pipe; electro-magnetic means for closing said valve; a normally open electric circuit for energizing said electro-magnetic means; a first relay for controlling said circuit; light sensitive means located on one side of said gage glass at a predetermined level for normally maintaining said relay open; a source of light located on the other side of said gage glass; and means for directing a beam of said light through said gage glass onto said light sensitive means, a second normally open electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for normally maintaining said second mentioned relay open; a second source of light located on the other side of said gage glass; means for directing a beam of said light through said gage glass onto said second mentioned light sensitive means; and opaque means in said gage glass for successively interrupting said light beams to successively close said relays and circuits controlled thereby and thus to energize said electro-magnetic means and close said valve as the level of the water in said boiler raises to said first predetermined level and thence to said second predetermined level.

7. A boiler feed water regulator comprising a feed pipe for supplying water to a boiler; a gage glass for indicating the level of the water in said boiler; a valve for controlling the flow of water through said feed pipe; electro-magnetic means for closing said valve; an electric circuit for energizing said electro-magnetic means; a first relay for controlling said circuit; light sensitive means located on one side of said gage glass at a predetermined level for controlling said relay; a source of light located on the other side of said gage glass; and means for directing a beam of said light through said gage glass onto said light sensitive means; a second electric circuit including said first mentioned circuit and by-passing said first mentioned relay for also energizing said electro-magnetic means; a second relay for controlling said second circuit; a second light sensitive means located on one side of said gage glass at a higher predetermined level than said first mentioned light sensitive means for controlling said second mentioned relay; a second source of light located on the other side of said gage glass; means for directing a beam of said light through said gage glass onto said second mentioned light sensitive means; and opaque means in said gage glass for successively controlling said first and second mentioned light sensitive means to successively close said valve as the level of the water in said boiler raises to said first predetermined level and thence to said second predetermined level.

8. A boiler feed water regulator comprising a feed pipe for supplying water to a boiler; a gage glass for indicating the level of the water in said boiler; a valve for controlling the flow of water through said feed pipe; means for controlling said valve; light sensitive means located on one side of said gage glass at a predetermined level for actuating said valve controlling means; a source of light located on the other side of said gage glass; and means for directing a beam of said light through said gage glass onto said light sensitive means; a second light sensitive means located on one side of said gage glass and at a higher predetermined level than said first mentioned light sensitive means for actuating said valve controlling means independently of said first mentioned light sensitive means; a second source of light located on the other side of said gage glass; means for directing a beam of said light through said gage glass onto said second mentioned light sensitive means; and a float in said gage glass for successively interrupting said light beams to successively close said valve as the level of the water in said boiler raises to said first predetermined level and thence to said second predetermined level.

9. A boiler feed water regulator comprising a feed pipe for supplying water to a boiler; a gage glass for indicating the level of the water in said boiler; a valve for controlling the flow of water through said feed pipe; means for controlling said valve; light sensitive means located on one side of said gage glass at a predetermined level for actuating said valve controlling means; a source of light located on the other side of said gage glass; and means for directing a beam of said light through said gage glass onto said light sensitive means; a second light sensitive means located on one side of said gage glass and at a higher predetermined level than said first mentioned light sensitive means for actuating said valve controlling means independently of said first mentioned light sensitive means; a second source of light located on the other side of said gage glass; means for directing a beam of said light through said gage glass onto said second mentioned light sensitive means; and opaque means in said gage glass for successively interrupting said light beams to successively close said valve as the level of the water in said boiler rises to said first predetermined level and thence to said second predetermined level.

10. A boiler feed water regulator comprising a feed pipe for supplying water to a boiler; means for indicating the level of the water in said boiler; a valve for controlling the flow of water through said feed pipe; means for controlling said valve; light sensitive means located at a predetermined level for actuating said valve controlling means; a source of light for activating said light sensitive means; a second light sensitive means located at a higher predetermined level than said first mentioned light sensitive means for actuating said valve controlling means independently of said first mentioned light sensitive means; a second source of light for activating said second mentioned light sensitive means; and means responsive to said level indicating means for successively interrupting said light beams to successively close said valve as the level of the water in said boiler rises to said first predetermined level and thence to said second predetermined level.

11. A boiler feed water regulator comprising a feed pipe for supplying water to a boiler; means for indicating the level of the water in said boiler; a valve for controlling the flow of water through said feed pipe; means including a light sensitive cell located at a first predetermined level for closing said valve and means including a second light sensitive cell located at a second predetermined level higher than said first mentioned level for closing said valve independently of said first mentioned valve closing means.

12. A boiler feed water regulator comprising a feed pipe for supplying water to a boiler; means for indicating the level of the water in said boiler; a valve for controlling the flow of water through said feed pipe; and means including two light sensitive cells each located at different levels and controlled by said level indicating means for successively and independently closing said valve.

ANDERSON OFFUTT.